United States Patent [19]
DeLong

[11] Patent Number: 5,555,213
[45] Date of Patent: Sep. 10, 1996

[54] INTERFACE CIRCUIT, SYSTEM AND METHOD FOR INTERFACING AN ELECTRONIC DEVICE AND A SYNCHRONOUS STATE MACHINE HAVING DIFFERENT CLOCK SPEEDS

[75] Inventor: Steven T. DeLong, Woodridge, Ill.

[73] Assignee: Rockwell International Corporation, Seal Beach, Calif.

[21] Appl. No.: 496,700

[22] Filed: Jun. 29, 1995

[51] Int. Cl.⁶ .................................................. H03K 19/00
[52] U.S. Cl. .................. 326/93; 375/356; 327/145; 327/155
[58] Field of Search .................. 326/93, 96, 46; 327/145, 146, 155, 144, 142; 375/356

[56] References Cited

U.S. PATENT DOCUMENTS

| | | | |
|---|---|---|---|
| 4,289,976 | 9/1981 | Maly | 327/145 |
| 5,047,658 | 9/1991 | Shrock et al. | 327/155 |
| 5,070,443 | 12/1991 | Priem et al. | 395/725 |
| 5,079,696 | 1/1992 | Priem et al. | 395/500 |
| 5,155,393 | 10/1992 | Gongwer et al. | 326/93 |
| 5,450,458 | 9/1995 | Price et al. | 375/356 |

*Primary Examiner*—Edward P. Westin
*Assistant Examiner*—Richard Roseen
*Attorney, Agent, or Firm*—C. B. Patti; S. R. Hewitt

[57] ABSTRACT

An interface circuit (100) for interfacing an electronic device, such as a microprocessor (102), operating at a device clock speed and a finite synchronous state machine (104) comprised of a D-type flip-flop (106) and a synchronous state machine (108), which are operating at a state clock speed, is provided. The device clock speed being capable of being greater than the state clock speed. The interface circuit° (100) comprises an input circuit, which may comprise a first NAND gate (120), connected to a latch circuit which may comprise interconnected second and third NAND gates (124) and (126). The input circuit and latch circuit store an input signal (121) received from the electronic device and transmit the input signal (121) to the flip-flop (106) when the synchronous state machine (108) is ready to accept further input signals. A system for operating the finite synchronous state machine (104) associated with a state clock speed and a method for interfacing an electronic device operating at a device clock speed and a synchronous state machine (108) operating at a state clock speed are also provided.

18 Claims, 3 Drawing Sheets

5,555,213

INTERFACE CIRCUIT, SYSTEM AND METHOD FOR INTERFACING AN ELECTRONIC DEVICE AND A SYNCHRONOUS STATE MACHINE HAVING DIFFERENT CLOCK SPEEDS

BACKGROUND OF THE INVENTION

The present invention is generally related to electrical circuits for interconnecting an electronic device, such as a microprocessor, and a synchronous state machine and, in particular, to an interface circuit and method for properly interconnecting an electronic device which operates at a device clock speed and an synchronous state machine that operates at a state clock speed wherein the device clock speed may be faster than the state clock speed.

Microprocessor speeds continue to increase due to advances in technology. It is likely that microprocessors having a clock speed of over 120 MHz will be common place. These increasing speeds have caused reliability problems when interconnecting the microprocessors to slower devices, such as synchronous state machines including field programmable gate arrays (FPGAs) and programmable array logic devices (PALs).

For reliable operation, the asynchronous input signals into a synchronous state machine must have two conditions. First, the input signals must be latched by a flip-flop in order to synchronize the input signals to the clock speed of the synchronous state machine to avoid metastability. Second, the pulse width of the input signals must be a minimum of one clock period of the synchronous state machine plus the setup time of the flip-flop.

These requirements cannot always be satisfied when interconnecting a fast microprocessor with a slower synchronous state machine. In particular, the requirement that the input signals have pulse widths at least as long as one clock period of the synchronous state machine cannot always be met.

These problems could be substantially obviated by manufacturing faster synchronous state machines. However, faster synchronous state machines would be prohibitively expensive and commercially unfeasible. Consequently, the microprocessor is typically operated at a slower speed. As is readily apparent however, this results in less than optimal operation of the microprocessor. The advantages of having the faster speed microprocessor are thus somewhat negated.

Accordingly, there is a need in the art for an interface circuit and method for interconnecting an electronic device operating at a device clock speed and a synchronous state machine operating at a state clock speed wherein the device clock speed may be greater than the state clock speed.

SUMMARY OF THE INVENTION

This need is met by an interface circuit, system and method for interfacing an electronic device operating at a device clock speed and a synchronous state machine operating at a state clock speed in accordance with the present invention wherein the device clock speed is capable of being greater than the state clock speed.

In accordance with one aspect of the present invention, an interface circuit for interfacing an electronic device being associated with a device clock speed and a finite synchronous state machine being associated with a state clock speed is provided. The device clock speed being capable of being faster than the state clock speed. The interface circuit comprises an input circuit for receiving an input signal from the electronic device and for generating a first output signal representative of the input signal. A latch circuit is connected to the input circuit for receiving the first output signal and for providing a latch signal representative of the first output signal to the finite synchronous state machine based on the state clock speed.

In accordance with another aspect of the present invention, a system for operating a finite synchronous state machine associated with a state clock speed is provided. The system comprises an electronic device for generating an input signal for activating the synchronous state machine. The electronic device generates the input signal based on a device clock speed which is capable of being greater than the state clock speed. An interface circuit receives the input signal, generates a latch signal representative of the input signal and properly transmits the latch signal to the finite synchronous state machine based on the state clock speed.

In accordance with yet another aspect of the present invention, a method for interfacing an electronic device operating at a device clock speed and a synchronous state machine operating at a state clock speed is provided. The device clock speed being capable of being greater than the state clock speed. The method comprises the steps of: receiving an input signal from the electronic device; detecting changes in the input signal, the changes in the input signal being based on the device clock speed; storing the changes in the input signal; detecting when the synchronous state machine is idle; and transmitting the changes in the input signal to the synchronous state machine when the synchronous state machine is idle based on the state clock speed.

These and other features and advantages of the present invention will become apparent from the following detailed description, the accompanying drawings and the appended claims.

DETAILED DESCRIPTION OF THE INVENTION

Figure 1:
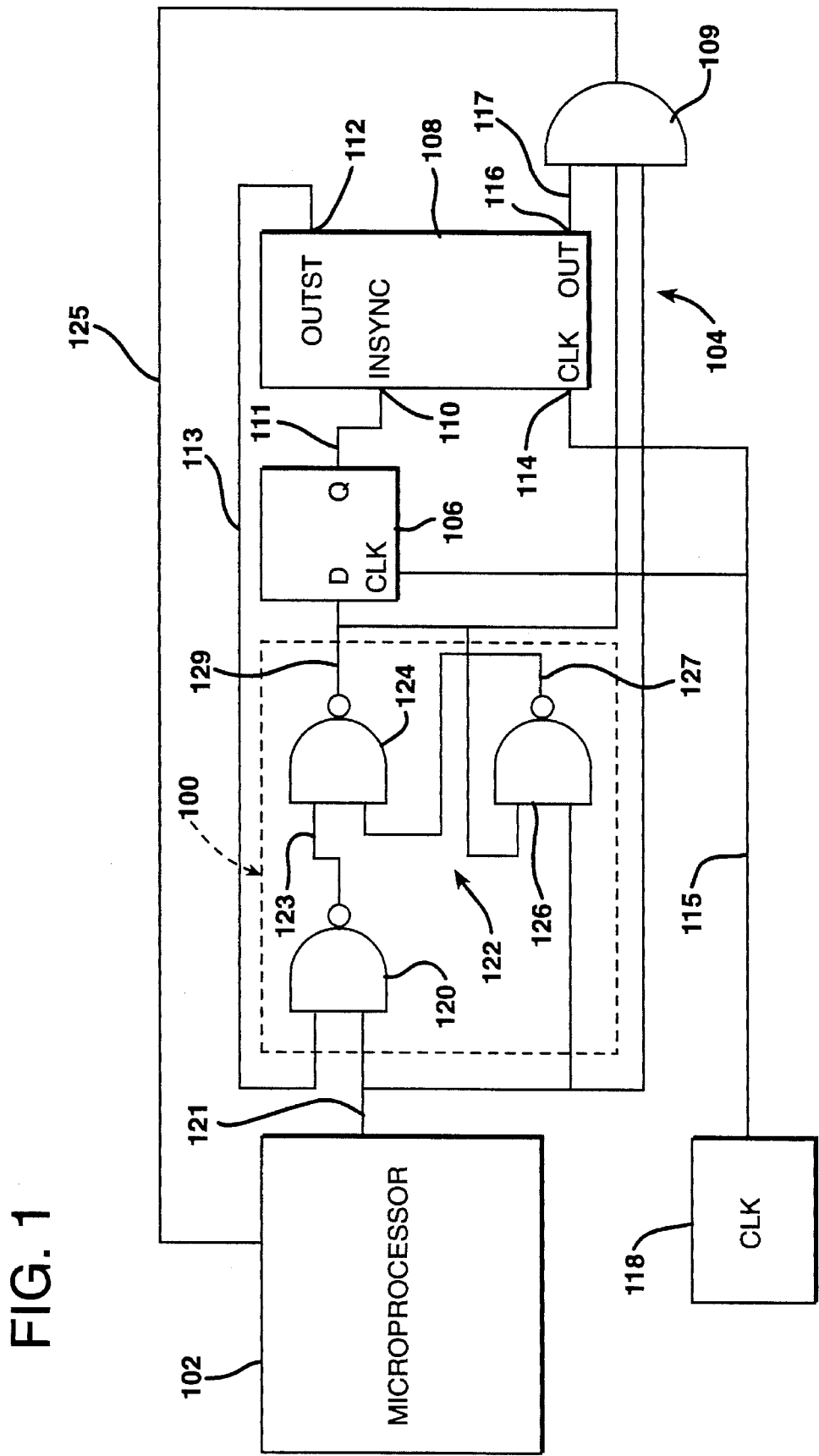
FIG. 1 is a schematic diagram of an interface circuit for properly interfacing an electronic device and a synchronous state machine in accordance with the present invention.

An interface circuit 100 for interconnecting an electronic device, preferably a microprocessor 102, and a finite synchronous state machine 104 in accordance with the present invention is shown in FIG. 1. Although any microprocessor may be advantageously employed in the present invention, the microprocessor 102 is preferably a 68000 series processor manufactured by the Motorola Company. The finite synchronous state machine 104 consists of a conventional D-type flip flop 106 connected to a conventional synchronous state machine 108. The synchronous state machine 108 includes an INSYNC input 110 for receiving an insync signal 111 from the flip flop 106, an OUTST output 112 for transmitting an idle signal 113 indicating that the state machine 108 is idle, a CLK input 114 for receiving a clock signal 115 and an OUT output 116 for transmitting an out signal 117 for indicating that the state machine 108 is ready for further inputs. A clock circuit 118 supplies the clock signal 115, or clock pulse train, to the flip flop 106 and the synchronous state machine 108. An AND gate 109 performs the AND operation on the out signal 117, an input signal 121 and a latch signal 129.

Both the microprocessor 102 and the finite synchronous state machine 104 have associated clock speeds which dictate the speed at which the respective devices operate. The microprocessor 102 operates at a predefined device clock speed which further defines a device clock period and the finite synchronous state machine 104 operates at a state clock speed which is defined by the clock signal 115 generated by the clock circuit 118. Due to technological advances in the art, commercial microprocessors are designed with greater and greater speeds. Unfortunately, commercially viable finite synchronous state machines have not been designed to operate at these higher speeds.

The device clock speed of the microprocessor 102 is typically faster than the state clock speed of the finite synchronous state machine 104, as described above. In particular, the slower state machine may fail to detect a transition in a signal from the microprocessor 102 since the signal may make the transition and return to its original state within a single state machine clock pulse. For example, the input signal 121 may transition from a first state, such as a high "1", to a second state, such as a low "0" and back to the first state totally between the state clock pulses. The synchronous state machine 108 would thus detect no changes in the input signal. In order to ensure proper operation, designers have historically reduced the operating speed of the microprocessor 102 to equal the operating speed of the finite synchronous state machine 104. The interface circuit 100 of the present invention obviates this deficiency by ensuring that the finite synchronous state machine 104 detects such signals from the microprocessor 102. The interface circuit 100, the microprocessor 102, the flip-flop 106, the clock circuit 118 and the AND gate 109 comprise a system for operating the synchronous state machine 108.

The interface circuit 100 is comprised of input circuit, shown as generating means comprising a first NAND gate 120, for receiving the input signal 121 from the microprocessor 102. The input signal 121 may be, for example, an Address Strobe from a Motorola 68000 family processor. The second input of the first NAND gate 120 receives the idle signal 113 from the synchronous state machine 108. An output signal 123 of the first NAND gate 120 is transmitted to latch circuit 122. The latch circuit 122 stores the output signal 123 until a clock pulse in the clock signal 115 is received from the clock circuit 118. In other words, the latch circuit 122 stores the input signal 121 until the synchronous state machine 108 is ready to receive another input signal.

The output signal 123 of the first NAND gate 120 is supplied to one of the input terminals of a second NAND gate 124 in the latch circuit 122. The input signal 121 from the microprocessor 102 is also supplied to a third NAND gate 126 within the latch circuit 122. As shown in FIG. 1, the second input of the second NAND gate 126 receives the output 127 of the third NAND gate 126. The second input of the third NAND gate 128 is the output 129 of the second NAND gate 124. As those skilled in the art will readily comprehend, the configuration of the second and third NAND gates 124, 126 as shown in FIG. 1 is a conventional R-S latch. The output 129 of the second NAND gate 124, referred hereinafter as a latch signal 129, is supplied to the D input on the flip flop 106, the AND gate 109 and, as noted above, one of the inputs of the third NAND gate 126. The AND gate 109 has three inputs, namely the input signal 121, the latch signal 129 and the out signal 117 and one output, namely a reset signal 125. The reset signal 125 is typically fed back to the microprocessor 102 to give an indication that the state machine 108 is prepared to receive additional inputs. The reset signal 125 may be, for example, a Data Taken Acknowledge for a Motorola 68000 family processor.

Figure 2:
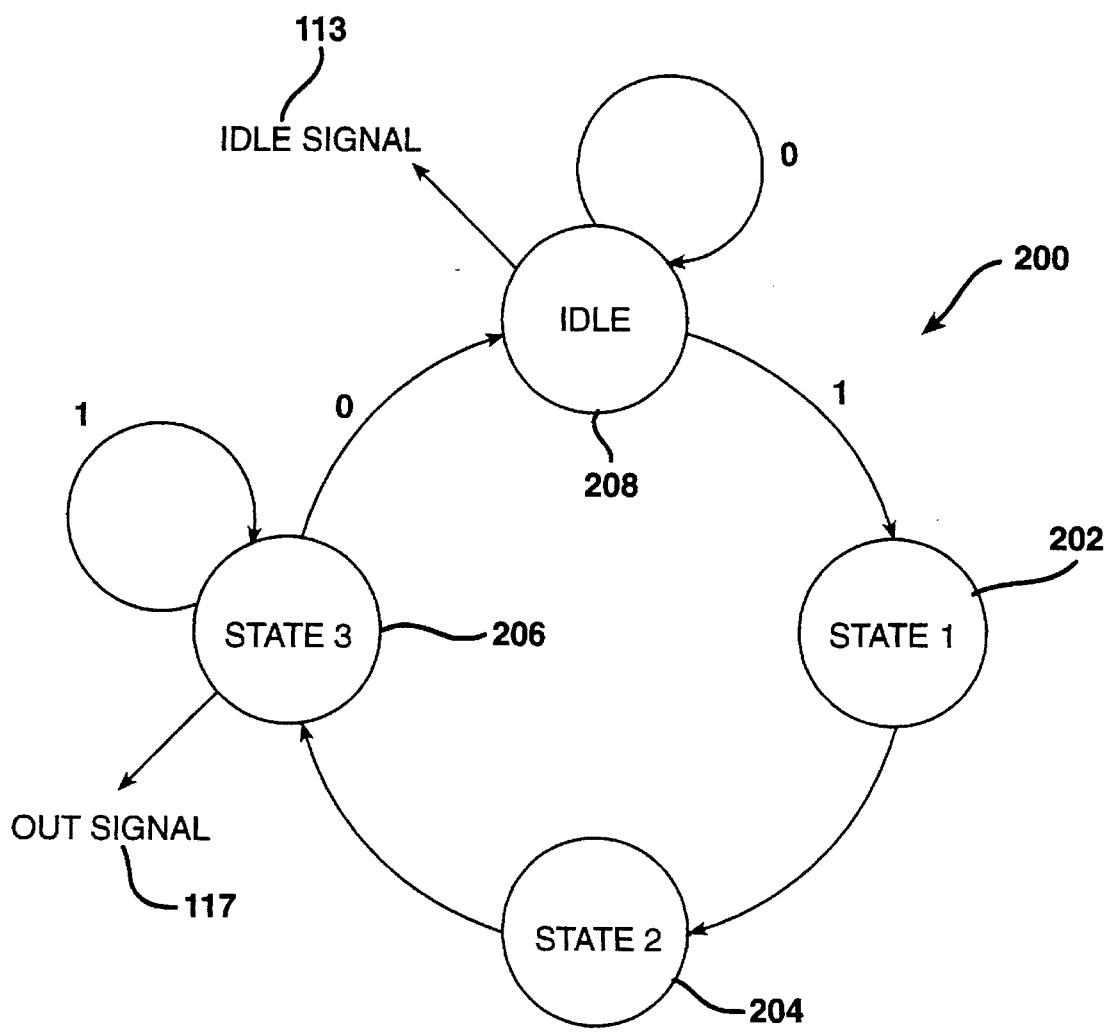
FIG. 2 is an exemplary state diagram for the synchronous state machine shown in FIG. 1.

A brief description of the operation of the interface circuit 100, and in particular the advantages thereof, will now be provided. The individual logic elements comprising the interface circuit 100 are all conventional and, as such, each operate in a well known manner. FIG. 2 shows an exemplary state diagram 200 for the synchronous state machine 108. As those skilled in the art will readily appreciate, there are numerous state diagrams which can be advantageously employed in the present invention and, as such, the state diagram 100 should be considered solely for illustrative purposes. A timing diagram 300 for the interface circuit 100 is shown in FIG. 3 wherein the synchronous state machine 108 is programmed in accordance with the state diagram 200.

Referring to FIG. 2, the synchronous state machine 108 has four states; state1 202, state2 204, state3 206 and an idle state 208. The state machine 108 remains in the idle state 208 as long as the insync signal 111 is low, or "0". While in the idle state 208, the idle signal 113 remains high. When the insync signal 111 transitions from low to high, or "1", the state machine 108 transitions from the idle state 208 to the state1 202. The state machine 108 then cycles into the state2 204 and thereafter into the state3 206. In response to entering the state3 206, the out signal 117 from the state machine 108 transitions to a high level "1". As long as the insync signal 111 is high, the state machine 108 stays in the state3 206 and the out signal 117 remains high. When the insync signal 111 changes to a low, the state machine 108 transitions to the idle state 208 and the out signal 117 concomitantly goes low. As will be apparent to those skilled in the art, the state machine transitions described above would occur in response to a clock pulse from the clock 118. Further, the state transitions just described are only exemplary and a number of state diagrams may be advantageously used in the present invention.

Figure 3:
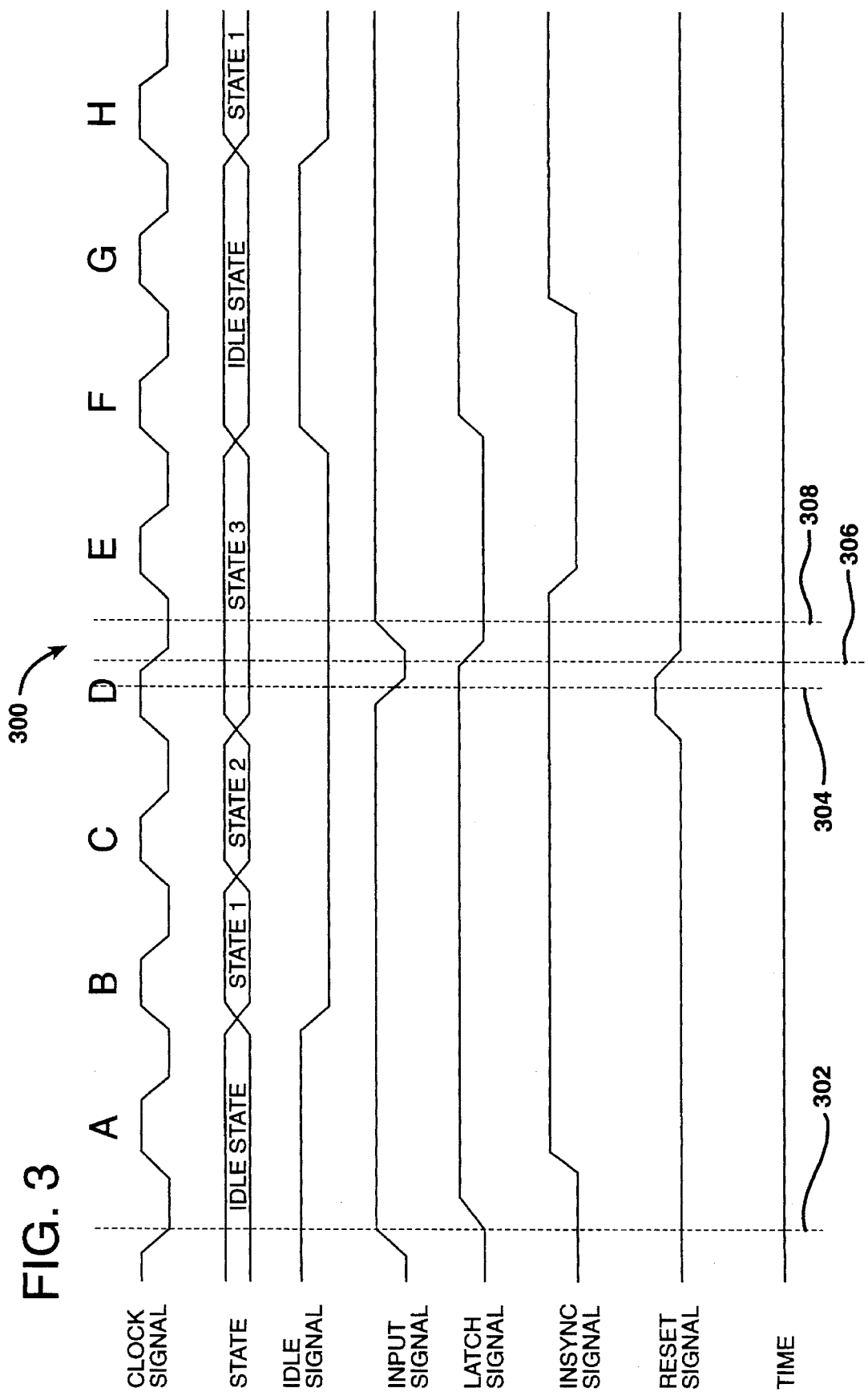
FIG. 3 are timing diagrams representing a clock signal, idle signal, input signal, latch signal, insync signal, reset signal, state of the state machine and time within the schematic diagram shown in FIG. 1.

Timing diagrams 300 of the clock signal 118, the state of the state machine 108, the idle signal 113, the input signal 121, the latch signal 129, the insync signal 111 and the reset signal 125 are shown in FIG. 3. As those skilled in the art will readily understand the operation of the components comprising the interface circuit 100 of the present invention only a brief description of the timing diagrams 300 will be given herein.

As can be seen in FIG. 3, the input signal 121 goes high, in response to the microprocessor 120, at time 302. In response to the change in the input signal 121, the latch signal 129 substantially simultaneously goes high. At the next clock pulse A, the flip flop 106 recognizes the high latch signal 129 and causes the insync signal 111 to go high. At clock pulse B, the synchronous state machine 108 recognizes the high insync signal 111 and transitions to the state1 202. Although this example assumes that the rising edge of the clock pulse is used as a trigger, those skilled in the art will readily comprehend that the falling edge of the clock pulse may be similarly used.

The idle signal 113 goes low in response to the state machine 108 transition to the state1 202. The state machine 108 then cycles to the state2 204 at the next clock pulse C. At clock pulse D, the state machine 108 changes to the state3

206 and, in response to this change, causes the reset signal 125 to go high. The high reset signal 125 is fed back to the microprocessor 102 which changes the input signal 121 to low at time 304 and subsequently causes the latch signal 129 to go low. This high reset signal 125 indicates to the microprocessor 102 that the state machine 108 is ready for additional input signals 121. Since the reset signal 125 is generated from performing the AND operation on the input signal 121, the latch signal 129 and the out signal 117, the reset signal 125 goes low, shown at time 306, when the input signal 121 goes low.

The microprocessor 102 is running at a faster clock speed than the state machine 108 and, therefore, raises the input signal 121 to a high level, ostensibly initiating a new request or sequence, before the next clock pulse E. This is shown at time 308 in the timing diagrams 300. Since this high-to-low-to-high transition of the input signal 121 occurs completely between clock pulses D and E, the state machine 108 would not detect this transition without the interface circuit 100 of the present invention.

At clock pulse E, the insync signal 111 goes low in response to the latch signal 129 being low. At the next clock pulse F, the state machine 108 changes to the idle state 208 in response to the low insync signal 111. Significantly, the reset signal 125 does not follow the input signal 121 and stays low as the input signal 121 changes between clock pulses D and E. Without the interface circuit 100 of the present invention, the reset signal 125 would transition from high-to-low-to-high substantially simultaneously with the input signal 121. In prior circuits, the state machine 108 would see exactly the same inputs at the clock pulse D and the clock pulse E and would thus remain in the state3 206 until the next low-to-high transition of the input signal 121 incorrectly indicating a reset output. Accordingly, the state machine 108 would miss the transition in the input signal 121.

Fortunately, with the present invention the state machine 108 detects the transition in the input signal 121 and, at clock pulse F, changes to the idle state 208 in response to the low insync signal 111. The change to the idle state 208 causes the idle signal 113 to go high which, in turn, causes the latch signal 129 to go high. Thereafter, at clock pulse G, the high latch signal 129 is passed through the flip flop 106 and the insync signal 111 goes high. In response, the state machine 104 transitions to the state1 202 and the process begins again. As can be thus seen, the state machine 104 begins its state transitions in response to the low-to-high transition of the input signal 121 which occurred between the clock pulses D and E.

A method for interfacing an electronic device, such as microprocessor 102, operating at a device clock speed and a synchronous state machine 108 operating at a state clock speed is also provided. The present invention permits the device clock speed to be greater than the state clock speed. The method comprises the steps of: receiving an input signal 121 from the electronic device; detecting changes in the input signal 121, the changes in the input signal 121 being based on the device clock speed; storing the changes in the input signal 121; detecting when the synchronous state machine 108 is idle; and transmitting the changes in the input signal 121 to the synchronous state machine 108 when the synchronous state machine 108 is idle based on the state clock speed.

The step of detecting when the synchronous state machine 108 is idle may preferably comprise the step of receiving an idle signal 113 from the synchronous state machine 108 indicating when the synchronous state machine 108 is idle. The step of detecting when the synchronous state machine 108 is idle may comprise the step of performing a NAND operation on the input signal 121 and the idle signal 113 such that the input signal 121 is provided to the synchronous state machine 108 when the synchronous state machine 108 is idle. The step of detecting changes in the input signal 121 may comprise the step of detecting when the input signal 121 changes from a first state to a second state to the first state within a clock period defined by the device clock speed.

Having thus described the invention in detail by way of reference to preferred embodiments thereof, it will be apparent that other modifications and variations are possible without departing from the scope of the invention defined in the appended claims. For example, the state machine 108 may be designed for a state diagram, or state table, which departs from those described herein.

What is claimed is:

1. An interface circuit for interfacing an electronic device being associated with a device clock speed and a finite synchronous state machine being associated with a state clock speed, the device clock speed capable of being faster than the state clock speed, the interface circuit comprising:

an input circuit for receiving an input signal from the electronic device and for generating a first output signal representative of the input signal, transitions in the input signal being based on the device clock speed; and a latch circuit for receiving the first output signal from the input circuit and for providing a latch signal representative of the first output signal to the finite synchronous state machine based on the state clock speed.

2. The interface circuit as recited in claim 1 wherein the finite synchronous state machine generates an idle signal when the synchronous state machine is idle, and wherein the input circuit comprises generating means for generating the first output signal in response to the idle signal.

3. The interface circuit as recited in claim 2 wherein the input circuit comprises a first NAND gate for receiving the input signal and the idle signal and for performing a NAND operation on the input signal and the idle signal to generate the first output signal.

4. The interface circuit as recited in claim 3 wherein the latch circuit comprises:

a second NAND gate for receiving the first output signal from the first NAND gate; and a third NAND gate for performing a NAND operation on the input signal and the latch signal to generate a second output signal, and wherein the second NAND gate performs a NAND operation on the first and second output signals to generate the latch signal.

5. A system for operating a finite synchronous state machine associated with a state clock speed, the system comprising:

an electronic device for generating an input signal for activating the synchronous state machine, the electronic device generating the input signal based on a device clock speed which is capable of being greater than the state clock speed; and an interface circuit for receiving the input signal, for generating a latch signal representative of the input signal and for properly transmitting the latch signal to the finite synchronous state machine based on the state clock speed.

6. The system as recited in claim 5 wherein the electronic device comprises a microprocessor.

7. The system as recited in claim 6 wherein the input signal comprises an address strobe signal from the microprocessor.

8. The system as recited in claim 5 comprising a clock circuit for generating a clock signal based on the state clock speed and for providing the clock signal to the interface circuit for controlling transmission of the input signal by the interface circuit.

9. The system as recited in claim 5 wherein the finite synchronous state machine generates an out signal indicating the finite synchronous state machine is able to accept further input signals, and, comprising an AND gate for performing an AND operation on the latch signal, the input signal and the out signal to generate a reset signal for transmission to the electronic device indicating the synchronous state machine is able to accept further input signals.

10. The interface circuit as recited in claim 5 wherein the finite synchronous state machine generates an idle signal when the finite synchronous state machine is idle and, wherein the interface circuit comprises a first NAND gate for receiving the input signal and the idle signal and for performing a NAND operation on the input signal and the idle signal to generate an output signal, and wherein, the interface circuit generates the latch signal based on the output signal.

11. The system as recited in claim 5 wherein the interface circuit comprises:

an input circuit for receiving the input signal from the electronic device and for generating a first output signal representative of the input signal when the finite synchronous state machine is idle; and a latch circuit for receiving the first output signal from the input circuit and for providing a latch signal representative of the first output signal to the finite synchronous state machine based on the state clock speed.

12. The interface circuit as recited in claim 11 wherein the input circuit comprises a first NAND gate for receiving the input signal and for generating the first output signal based on the input signal and when the finite synchronous state machine is idle.

13. The system as recited in claim 12 wherein the latch circuit comprises:

a second NAND gate for receiving the first output signal from the input circuit; and a third NAND gate for performing a NAND operation on the input signal and the latch signal to generate a second output signal, and wherein the second NAND gate performs a NAND operation on the first and second output signals to generate the latch signal.

14. The system as recited in claim 12 wherein the latch circuit comprises:

a second NAND gate for receiving the first output signal from the input circuit and for generating the latch signal based on the first output signal; and a third NAND gate for performing a NAND operation on the input signal and the latch signal to generate a second output signal, and wherein the second NAND gate performs a NAND operation on the first and second output signals to generate the latch signal.

15. A method for interfacing an electronic device operating at a device clock speed and a synchronous state machine operating at a state clock speed, the device clock speed being capable of being greater than the state clock speed, the method comprising the steps off receiving an input signal from the electronic device;

detecting changes in the input signal, the changes in the input signal being based on the device clock speed;

storing the changes in the input signal;

detecting when the synchronous state machine is idle; and transmitting the changes in the input signal to the synchronous state machine when the synchronous state machine is idle based on the state clock speed.

16. The method as recited in claim 15 wherein the step of detecting when the synchronous state machine is idle comprises the step of receiving an idle signal from the synchronous state machine indicating when the synchronous state machine is idle.

17. The method as recited in claim 16 wherein the step of detecting when the synchronous state machine is idle comprises the step of performing a NAND operation on the input signal and the idle signal such that the input signal is provided to the synchronous state machine when the synchronous state machine is idle.

18. The method as recited in claim 15 wherein the step of detecting changes in the input signal comprises the step of:

detecting when the input signal changes from a first state to a second state to the first state, the changes in the input signal occurring within a clock period defined by the state clock speed.

\* \* \* \* \*